(No Model.)

A. W. THOMAS.
WHEEL TIRE AND FELLY.

No. 399,360. Patented Mar. 12, 1889.

WITNESSES:
Hermann Bormann
Thomas M. Smith.

INVENTOR:
Amos W. Thomas,
By J. Walter Douglass.
ATT'Y.

UNITED STATES PATENT OFFICE.

AMOS W. THOMAS, OF PHILADELPHIA, PENNSYLVANIA.

WHEEL TIRE AND FELLY.

SPECIFICATION forming part of Letters Patent No. 399,360, dated March 12, 1889.

Application filed June 30, 1888. Serial No. 278,645. (No model.)

*To all whom it may concern:*

Be it known that I, AMOS W. THOMAS, a citizen of the United States, residing at the city of Philadelphia, in the county of Philadelphia and State of Pennsylvania, have invented certain new and useful Improvements in Tires and Fellies for the Wheels of Vehicles, of which the following is a specification.

My present invention relates to an improved flexible or elastic solid or partially-solid tire provided with one or more webs or ribs which are caused to engage with a two-part concave or curved felly.

My invention is, in general, applicable to the road-wheels of carriages, wagons, or other rolling conveyances, but more particularly to the road-wheels of bicycles, tricycles, and velocipedes of all varieties.

The principal object of my invention is to provide an improved tire and two-part felly for a wheel of simple construction, yet at the same time strong, durable, and serviceable, and especially adapted for use in connection with the road-wheels of bicycles and other rolling conveyances.

The characteristic features of my invention will be more particularly understood taken in connection with the accompanying drawings, forming part hereof, and in which—

Figure 1:
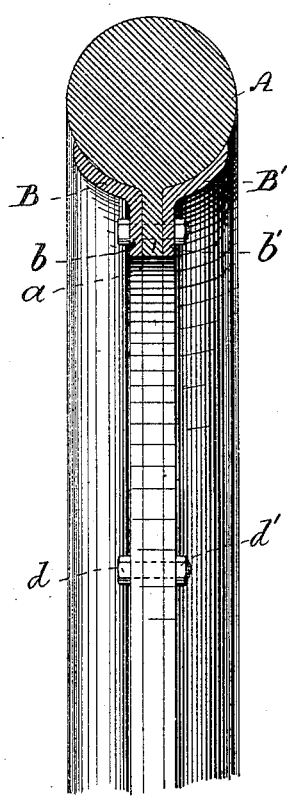
Figure 2:
Figure 3:
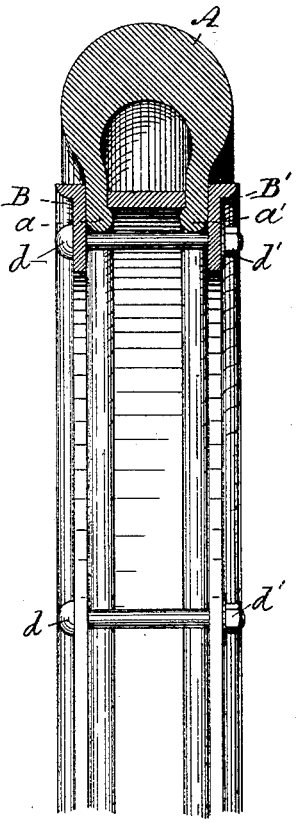

Figure 1 is a transverse sectional view of my improved solid flexible tire provided with a centrally-located web or rib held between a two-part concave felly by means of bolts and nuts, the said felly being shown partly in section and partly in elevation. Fig. 2 is a similar view of my improved solid flexible tire provided with a web or rib held in an oblong channel formed with a concave two-part felly by means of bolts, and which felly is shown partly in section and partly in elevation; and Fig. 3 is a similar view of a modified form of tire constructed in part solid with the sides, near the outer extremities enlarged, and which are brought into engagement with the annular rim and the flanged rings forming the felly by means of bolts and nuts, and the said felly being shown therein partly in section and partly in elevation.

Referring to the drawings for a further description of the invention, A is a solid tire of cylindrical form made of rubber or other suitable elastic or flexible material and provided with a web or rib, $a$.

B and B' are two curved or concave rings made of metal, wood, or other material, and provided with depending inner extremities, $b$ and $b'$, which are preferably formed integral with the curved or concave rings B and B', forming the felly of the wheel.

The rib or web $a$ of the tire is caused to engage between the two-part felly, and is held firmly thereto by means of bolts $d$ and nuts $d'$, as shown, for instance, in Fig. 1, whereby a very strong and durable tire and supporting-felly is provided, especially adapted for use in connection with the road-wheels of bicycles or other analogous rolling conveyances.

In Fig. 2 is shown a slightly-modified form of felly in application to my improved solid flexible tire A, with a centrally-located rib or web, $a$. In this instance the felly is in two parts, B and B', with vertically-depending inner extremities, $b$ and $b'$. The extremity $b$ of the part B is provided with a right-angular projection, $b^2$, which, when the two parts constituting the felly are caused to assume their normal operative position, engages with or rests upon the projection $b'$, and the tire and felly held firmly in position by means of bolts $d$.

In Fig. 3 is illustrated a modification of the tire and felly shown, for instance, in Figs. 1 and 2, the tire A being constructed of rubber or other flexible material, having the portion which constitutes the tread of the tire preferably formed two or more times the thickness of the sides thereof, and the sides preferably bent into a cylindrical form, with the portions near the outer extremities thickened so as to form enlargements $a$ and $a'$ thereat. Just above or beyond these enlargements is inserted an annular rim, which forms a bearing-surface for the inner surface of the sides of the tire A, and against the outer surface of the tire is caused to engage on each side a flanged or other suitable form of ring, B or B'. Through the two rings constituting the felly of the wheel are inserted bolts $d$, and on the threaded extremities of which are mounted nuts $d'$, thereby presenting as so arranged a very strong and durable felly and tire for various uses in connection with the road-wheels of rolling conveyances.

The tire may be made of leather, woven or textile fabric properly filled in or treated to make the same either wholly or partially solid, whichever may be desired, yet nevertheless I give preference to the use of rubber, because well adapted for the purpose.

If desired, the tongues or ribs of the tire may be cemented into the curved portions of the felly and the depending channel formed with the same in order that the tire may be held very solidly in position therein.

Having thus described the nature and objects of my invention, what I claim as new, and desire to secure by Letters Patent, is—

The combination of the non-inflatable flexible tire A, a rim interposed between the sides of said tire, rings B and B', and means, as described, for clamping said rim and rings to the sides of said tire, substantially as shown and described.

In witness whereof I have hereunto set my signature in the presence of two subscribing witnesses.

AMOS W. THOMAS.

Witnesses:
W. A. WHITMORE,
GEO. W. REED.